United States Patent
Agombar et al.

(10) Patent No.: US 9,875,052 B2
(45) Date of Patent: Jan. 23, 2018

(54) STORAGE CAPACITY ALLOCATION USING DISTRIBUTED SPARE SPACE

(71) Applicant: INTERNATIONAL BUSINESS MACHINES CORPORATION, Armonk, NY (US)

(72) Inventors: John P. Agombar, Winchester (GB); Ian Boden, Eastleigh (GB); Gordon D. Hutchison, Eastleigh (GB); Lee J. Sanders, Chichester (GB)

(73) Assignee: International Business Machines Corporation, Armonk, NY (US)

( * ) Notice: Subject to any disclaimer, the term of this patent is extended or adjusted under 35 U.S.C. 154(b) by 1 day.

(21) Appl. No.: 15/070,029

(22) Filed: Mar. 15, 2016

(65) Prior Publication Data

US 2017/0269862 A1  Sep. 21, 2017

(51) Int. Cl.
*G06F 3/06* (2006.01)

(52) U.S. Cl.
CPC .......... *G06F 3/0631* (2013.01); *G06F 3/0608* (2013.01); *G06F 3/0647* (2013.01); *G06F 3/0689* (2013.01)

(58) Field of Classification Search
CPC .... G06F 3/0631; G06F 3/0689; G06F 3/0647; G06F 11/1088; G06F 11/1092
USPC ......................................................... 711/114
See application file for complete search history.

(56) References Cited

U.S. PATENT DOCUMENTS

| | | | |
|---|---|---|---|
| 5,258,984 A | 11/1993 | Menon et al. | |
| 7,308,600 B2 * | 12/2007 | Dubai | G06F 11/2094 714/6.1 |
| 8,086,893 B1 * | 12/2011 | MacFarland | G06F 11/1088 714/3 |
| 8,677,066 B2 | 3/2014 | Agombar et al. | |

(Continued)

FOREIGN PATENT DOCUMENTS

| | | |
|---|---|---|
| CN | 102446072 A | 5/2012 |
| WO | 2012045529 A1 | 4/2012 |

OTHER PUBLICATIONS

Disclosed Anonymously, "A Method and System for Dynamically Balancing Spare Drives, DA Pair and a Processor Node of RAID arrays in a Storage Environment", An IP.com Prior Art Database Technical Disclosure, IP.com No. IPCOM000239351D, IP.com Electronic Publication Date: Nov. 1, 2014, 6 pages.

(Continued)

*Primary Examiner* — Than Nguyen
(74) *Attorney, Agent, or Firm* — Michael O'Keefe

(57) ABSTRACT

Method and system are provided for storage capacity allocation. The method includes: providing a storage pool having multiple storage drive arrays; designating an initial available storage capacity in the storage pool; and allocating the remaining storage capacity in the storage pool to distributed spare space, wherein distributed spare space spreads portions of a spare drive across multiple storage drives in an array. The method also includes: monitoring an amount of available storage capacity as data is stored to the storage pool and determining when a threshold of a minimum (Continued)

available storage capacity is reached; and re-allocating one or more distributed spare drives from an array to available storage capacity when the threshold of the minimum available storage capacity is reached.

20 Claims, 10 Drawing Sheets

(56) References Cited

U.S. PATENT DOCUMENTS

| | | | | |
|---|---|---|---|---|
| 8,751,739 | B1* | 6/2014 | Bjornsson | G06F 3/0605 |
| | | | | 711/100 |
| 9,032,148 | B2 | 5/2015 | Agombar et al. | |
| 9,195,412 | B2 | 11/2015 | Brown et al. | |
| 2014/0082279 | A1 | 3/2014 | Kimmel et al. | |
| 2014/0208028 | A1 | 7/2014 | Coronado et al. | |
| 2015/0058530 | A1* | 2/2015 | Reddy | G06F 3/0616 |
| | | | | 711/103 |
| 2015/0242152 | A1 | 8/2015 | Agombar et al. | |
| 2015/0269023 | A1* | 9/2015 | Taranta, II | G06F 11/1076 |
| | | | | 714/766 |
| 2016/0041764 | A1 | 2/2016 | Brown et al. | |

OTHER PUBLICATIONS

EP Application No. 10186891.7, Filed on Oct. 7, 2010, entitled: "A System and Method for RAID Array Transformation", 21 pages.

EP Application No. 10186887.5, Filed on Oct. 7, 2010, entitled: "A System and Method for RAID Array Transformation in Pooled Storage", 17 pages.

Mell et al., "The NIST Definition of Cloud Computing", National Institute of Standards and Technology, U.S. Department of Commerce, Special Publication 800-145, Recommendations of the National Institute of Standards and Technology, Sep. 2011, 7 pages.

* cited by examiner

Figure 3A  Figure 3B  Figure 3C
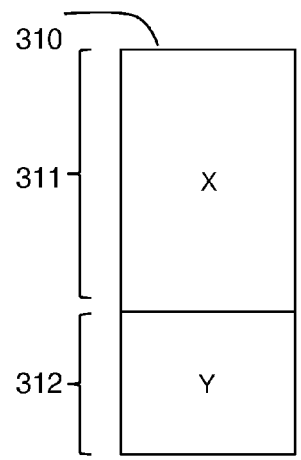
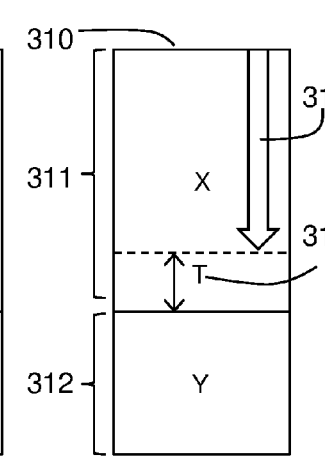
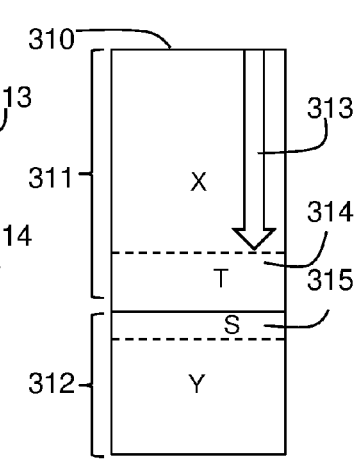
Figure 3D  Figure 3E
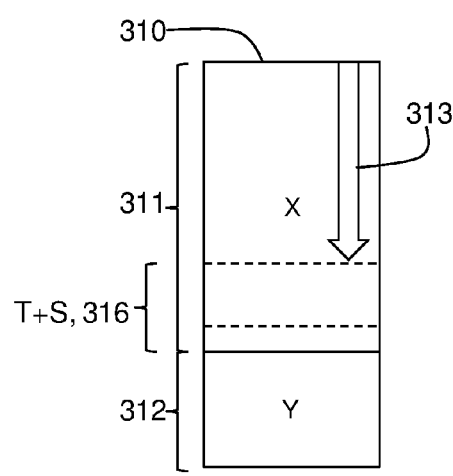
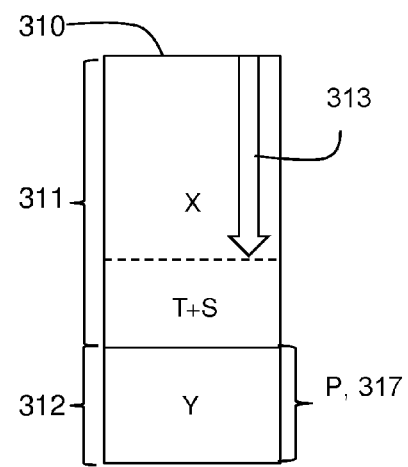

| 610 | 620 | 630 | 640 |
|-----|-----|-----|-----|
| 1:1 | 1 | D | 0 |
| 1:2 | 2 | D | 0 |
| 1:3 | 3 | D | 0 |
| 1:4 | 4 | D | 0 |
| 1: | 5 | S1 | 0 |
| 1:5 | 6 | D | 1 |
| 1:6 | 7 | D | 1 |
| 1: | 8 | S2 | 1 |
| 1: | 9 | S3 | 2 |
| 1:7 | 10 | D | 3 |
| 1:8 | 11 | D | 3 |

631 → (row with S1)
632 → (row with S2)
633 → (row with S3)

| 610 | 620 | 630 | 640 |
|-----|-----|-----|-----|
| 1:1 | 1 | D | 0 |
| 1:2 | 2 | D | 0 |
| 1:3 | 3 | D | 0 |
| 1:4 | 4 | D | 0 |
| 1: | 5 | D | 0 |
| 1:5 | 6 | D | 1 |
| 1:6 | 7 | D | 1 |
| 1: | 8 | S2 | 1 |
| 1: | 9 | S3 | 2 |
| 1:7 | 10 | D | 3 |
| 1:8 | 11 | D | 3 |
| 1:9 | - | D-> S5 | |

| 610 | 620 | 630 | 640 |
|-----|-----|-----|-----|
| 1:1 | 1 | D | 0 |
| 1:2 | 2 | D | 0 |
| 1:3 | 3 | D | 0 |
| 1:4 | 4 | D | 0 |
| 1:5 | 5 | D | 0 |
| 1:6 | 6 | D | 0 |
| 1:7 | 7 | D | 0 |
| 1: | 8 | S2 | 0 |
| 1: | 9 | S3 | 1 |
| 1:8 | 10 | D | 2 |
| 1:9 | 11 | D | 2 |

644

STORAGE CAPACITY ALLOCATION USING DISTRIBUTED SPARE SPACE

BACKGROUND

The present invention relates to storage pools, and more specifically, to storage capacity allocation using distributed spare space.

RAID (Redundant Array of Independent Disks) arrays are known to have physical spares in the form of real disk drives that can be substituted into an array when a member of the array fails. If a RAID array is to be provided with maximum robustness, particularly in a setup where a number of physical drive maintenance sessions by a maintenance engineer is minimized, many spare drives may be provided in order to cover for multiple failures and a longer period of lights-off operation.

With increased size of data centers, even with the statistical reliability of modern drives, the sheer number of drives mean that efficiently managing drive failure and replacement is a big part of the total cost-of-ownership in large and distributed systems.

SUMMARY

According to an embodiment of the present invention there is provided a computer-implemented method for storage capacity allocation, including: providing a storage pool having multiple storage drive arrays; designating an initial available storage capacity in the storage pool; allocating the remaining storage capacity in the storage pool to distributed spare space, wherein distributed spare space spreads portions of a spare drive across multiple storage drives in an array; monitoring an amount of available storage capacity as data is stored to the storage pool and determining when a threshold of a minimum available storage capacity is reached; and re-allocating one or more distributed spare drives from an array to available storage capacity when the threshold of the minimum available storage capacity is reached.

According to an additional embodiment of the present invention there is provided a system for storage capacity allocation, including: a processor and a memory configured to provide computer program instructions to the processor to execute the function of components; a storage pool configuration component for designating an initial available storage capacity in a storage pool having multiple storage drive arrays and allocating the remaining storage capacity in the storage pool to distributed spare space, wherein distributed spare space spreads portions of a spare drive across multiple storage drives in an array; a storage capacity monitoring component for monitoring an amount of available storage capacity as data is stored to the storage pool; a capacity threshold component for determining when a threshold of a minimum available storage capacity is reached; and a re-allocation component for re-allocating one or more distributed spare drives from an array to available storage capacity when the threshold of the minimum available storage capacity is reached.

According to an additional embodiment of the present invention there is provided a computer program product for storage capacity allocation, the computer program product including a computer readable storage medium having program instructions embodied therewith, the program instructions executable by a processor to cause the processor to: provide a storage pool having multiple storage drive arrays; designate an initial available storage capacity in the storage pool; allocate the remaining storage capacity in the storage pool to distributed spare space, wherein distributed spare space spreads portions of a spare drive across multiple storage drives in an array; monitor an amount of available storage capacity as data is stored to the storage pool and determining when a threshold of a minimum available storage capacity is reached; and re-allocate one or more distributed spare drives from an array to available storage capacity when the threshold of the minimum available storage capacity is reached.

BRIEF DESCRIPTION OF THE DRAWINGS

The following detailed description, given by way of example and not intended to limit the invention solely thereto, will best be appreciated in conjunction with the accompanying drawings, in which:

FIGS. 3A to 3E are schematic diagrams illustrating an example according to an exemplary embodiment;

FIGS. 6A to 6C are schematic diagrams illustrating an example embodiment of a method;

Figure 1:
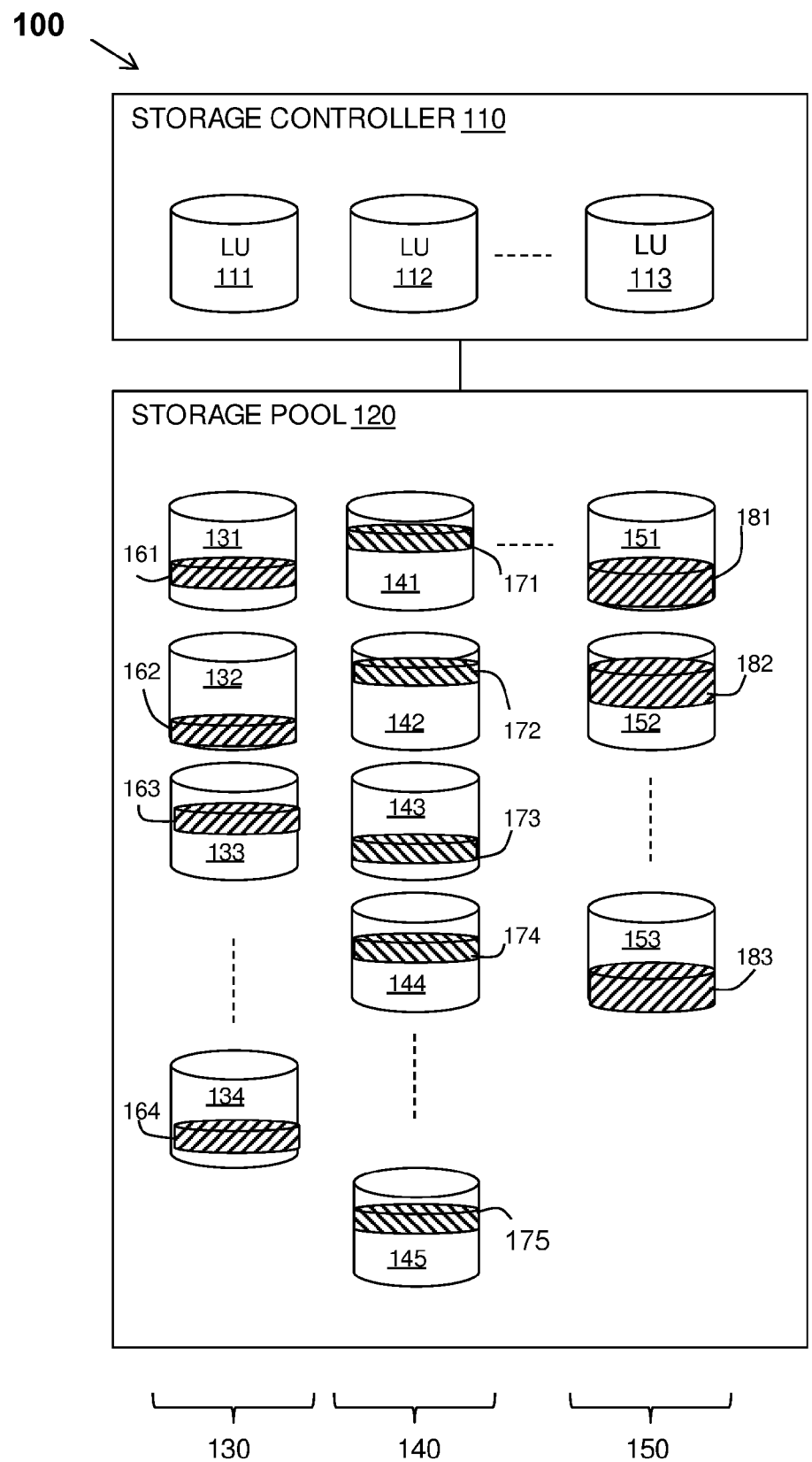
FIG. 1 is a schematic diagram of a storage system according to an exemplary embodiment.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper", "lower", "right", "left", "vertical", "horizontal", "top", "bottom", and derivatives thereof shall relate to the disclosed structures and methods, as oriented in the drawing figures. The terms "overlying", "atop", "on top", "positioned on" or "positioned atop" mean that a first element, such as a first structure, is present on a second element, such as a second structure, wherein intervening elements, such as an interface structure may be present between the first element and the second element. The term "direct contact" means that a first element, such as a first structure, and a second element, such as a second structure, are connected without any intermediary conducting, insulating or semiconductor layers at the interface of the two elements.

In the interest of not obscuring the presentation of embodiments of the present invention, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is rather focused on the distinctive features or elements of various embodiments of the present invention.

In distributed sparing, instead of a dedicated spare drive, a portion of each of the member drives is allocated to act as a logical spare area that, when combined together, acts as the equivalent of a spare drive. For example, if there is an array of N drives, then if each drive sets aside 1/Nth of its space towards a distributed spare, then when a drive fails, all remaining drives take part in the drive rebuild. With distributed spares there is the flexibility to minimize maintenance sessions, as spares are a logical configuration or geometry issue and not tied tightly to idle physical drives.

The more distributed spares there are, the longer the RAID array can continue to operate without physical maintenance, saving money and administrative staff and time. However, each additional distributed spare decreases the size of the array. The use case for distributed spare space tends to be sudden, urgent and chunked at a minimum of a whole drive.

With increased size of data centers, even with the statistical reliability of modern drives, the sheer number of drives mean that efficiently managing drive failure and replacement is a big part of the total cost-of-ownership in large and distributed systems.

The described method and system relate to dynamic provisioning of storage arrays in which a storage pool or subsystem is set up with a designated data storage capacity and the remaining space is allocated to distributed spares. More distributed spare space is allocated than is needed to provide a safety margin. As the storage pool use nears the designated capacity, a distributed spare disk of space is sacrificed and re-allocated and the usable pool capacity grows in size by one drive.

The described method allows a storage subsystem that pre-assigns space to usable storage and to spare space, to reassign capacity from one to the other during operation.

The described method has an advantage compared to existing products which do not pre-assign storage to usable capacity or to spare space and therefore do not distinguish between unused capacity and spare space.

The described method allows for additional distributed spare spaces to be allocated optimally and for spare space to be re-assigned in order to increase the size of available storage capacity in the array and thus the storage pool, as necessary. This allows the system to be more generous in default allocation of distributed spare space.

Referring to FIG. 1, a storage system 100 is shown as an example system in which the described method may be implemented. The described method and system may be implemented in a variety of different storage system arrangements in which a pool of storage resources formed of multiple storage device arrays are used.

The storage system 100 may include a storage controller 110 and a storage pool 120. The storage controller 110 may be provided via a network such as a storage area network (SAN) and the storage pool 120 may be distributed across multiple systems, which may also be provided via a network. The storage controller 110 may provide storage functionality to multiple host devices.

The storage pool 120 may include multiple storage drive arrays 130, 140, 150 and each storage drive array 130, 140, 150 may be referenced by a logical unit (LU) 111, 112, 113 as used by the storage controller 110. Each storage drive array 130, 140, 150 may include multiple disk drives, 131-134, 141-145, 151-153, respectively.

Distributed spare storage is a method in which a portion of each of the member drives is allocated to act as a logical spare area. When the logical spare areas of all the drives in an array are combined together, they act as the equivalent of a spare drive. For example, if there is an array of N drives, then if each drive sets aside 1/Nth of its space towards a distributed spare, then when a drive fails, all remaining drives take part in the drive rebuild. This is illustrated as spare areas 161-164 of the first storage drive array 130, spare areas 171-175 of the second storage drive array 140, and spare areas 181-183 of the third storage drive array 150. It should be noted that there may be multiple chunks of spare areas in a drive. The amount of spare space provided by distributed spares in an array may combine to equal one or more spare drives of space.

Figure 2:
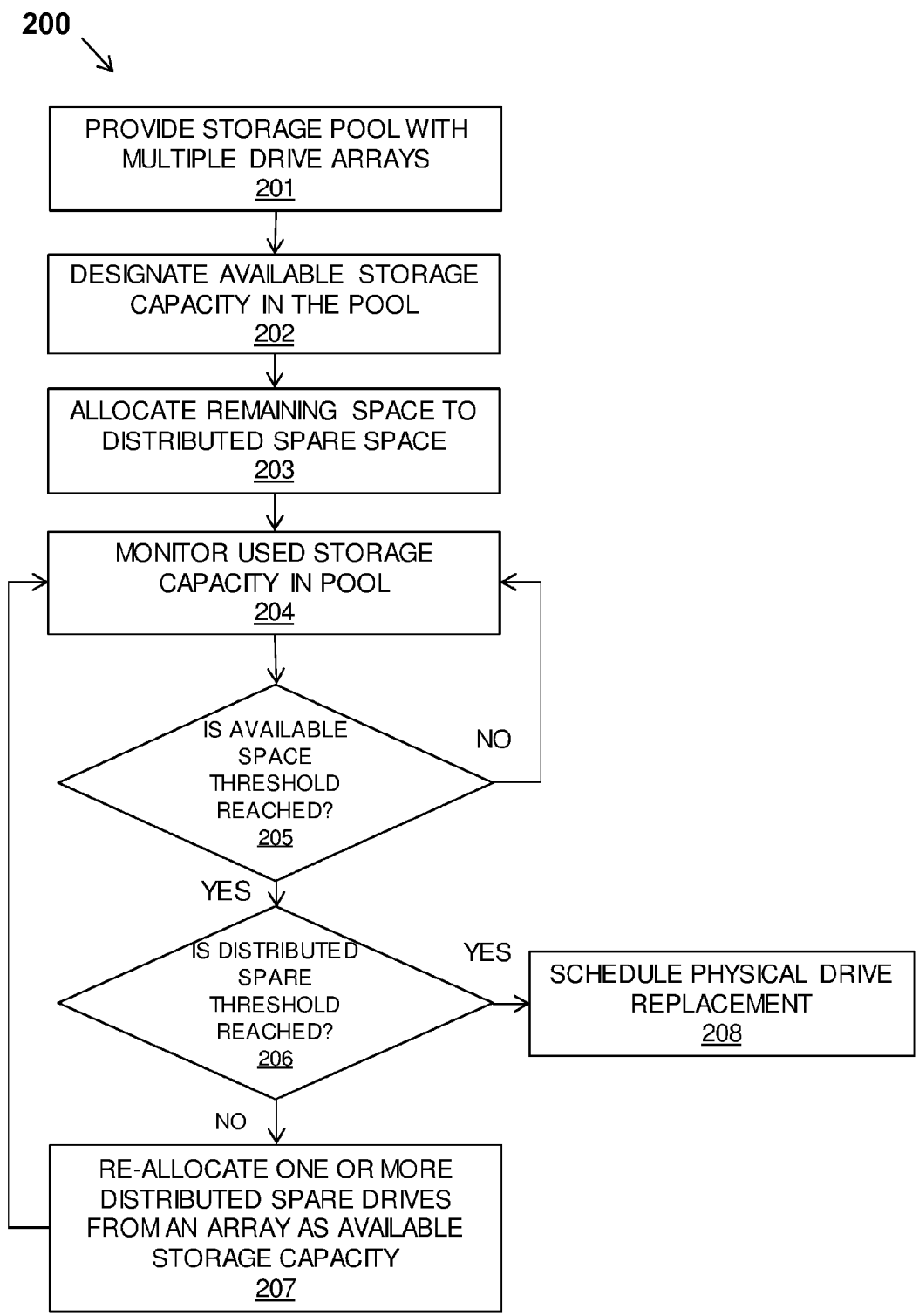
FIG. 2 is a flow diagram of an example embodiment of a method.

Referring to FIG. 2, a flow diagram 200 shows an example embodiment of the described method as carried out by a storage controller.

A storage pool is set up in the form of multiple storage drive arrays, step 201, with an initial designated size of available storage capacity, step 202, and the remainder of the space in the storage pool is allocated, step 203, to distributed spare space. The chosen size of available storage capacity may be set dynamically, for example, as current volume plus a reserve margin, such as 30%.

Operation of the storage pool is carried out with storage space from the available storage capacity used to store data. The method may monitor, step 204, the used storage capacity in the storage pool.

A threshold of minimum available storage capacity may be defined and it may be determined, step 205, if the threshold is reached during monitoring of the used storage capacity. It the threshold has not yet been reached, the monitoring 204 may continue. However, if the threshold of minimum available storage capacity has been reached, it may be determined, step 206, if a minimum distributed spare space threshold is reached.

If the minimum distributed spare space threshold has not been reached, re-allocation, step 207, of one or more distributed spare drives is made from an array in the storage pool to make it available as storage capacity.

However, if the minimum distributed spare space threshold has been reached, a physical drive replacement is scheduled, step 208, as the overall storage capacity is becoming critically low.

The re-allocation may be carried out repeatedly until the minimum distributed spare space threshold is reached.

This allows the system to continue operation without physical maintenance for the maximum period of time. As the storage pool nears a threshold of available storage capacity, for example 20% free, a distributed spare drive is sacrificed and the pool grows by the size of one drive. The threshold of available storage capacity provides a buffer during which storage space may be re-allocated from the distributed spare space. The system continues to operate for the maximum possible time before requiring a number of physical drives to be replaced in one, cheaper, batch operation.

FIGS. 3A to 3E are a series of schematic diagrams, which illustrate a method of the flow diagram 200 of FIG. 2.

In FIG. 3A, a storage pool 310 is shown with a first portion 311 of the storage space designated as available storage capacity X and a second portion 312 of the storage space designated as distributed spare space Y. Together X and Y form the total storage space of the storage pool 310.

In FIG. 3B, the storage pool 310 is used with available storage capacity X from the first portion 311 being used to store data as shown by the arrow 313. A threshold T 314 of a minimum amount of available storage capacity remaining is configured.

Referring to FIG. 3C, as the threshold T 314 is reached, a portion S 315 of the second portion 312 of the storage space designated as distributed spare space Y is re-allocated from the second portion 312 of distributed spare space Y to the first portion 311 of available storage capacity X.

FIG. 3D, shows the storage pool 310 with an increased amount of available storage space T+S 316 in the first portion 311 of available storage capacity X. Data may be stored in the available storage capacity X until the threshold T is again reached.

This method may be repeated gradually moving storage space from the second portion 312 of distributed spare space Y to the first portion 311 of available storage capacity.

FIG. 3E, shows that a second threshold P 317 may be provided for the minimum size of the second portion 312 of distributed spare space Y. When any further re-allocation will result in the second portion 312 going below the second threshold P 317, physical drive replacement may be scheduled in order to provide further storage space to the storage pool by replacing failed drives.

Typically a pool may be configured to be an integer number of disk drives in size; for example, 20 disk drives which each contain 1 terabyte memory, resulting in 20 terabytes of memory available. From this 20 terabyte pool, users may configure storage capacity with each volume using up some of the memory available. 'Volumes' are user disk areas provided to the client systems. Having spare storage capacity may be useful as it allows for new volumes to be allocated.

The described method allows a pool size to float at the current use capacity (used by allocated user volumes) plus some margin, rather than a fixed size, to allow for new volumes to be created (for example, 30% of the current used capacity). Thus the method may be configured to keep 30% of the pool free for new volumes to be added rather than to have a set size of, for example, 20 terabytes.

The described method provides a greater amount of space used as distributed spares at the outset of a storage pool operation compared to conventional systems in which a designated minimum amount of distributed spare space is configured.

With fixed pool sizes, capacity is used up to allow for space for growth in user volumes in each pool that might never be used. At the same time, the static 'room for growth' planned into another pool may be exhausted but any unused space cannot be transferred. If pools start small in size but are grown as the volumes grow, then space is only assigned to where that growth actually occurs and is needed.

The user does not need to predict ahead of time how much space must be set aside to cope with drive failure. They may often get this wrong if there is low growth but high failures, or high volume growth and low failures.

Figure 4:
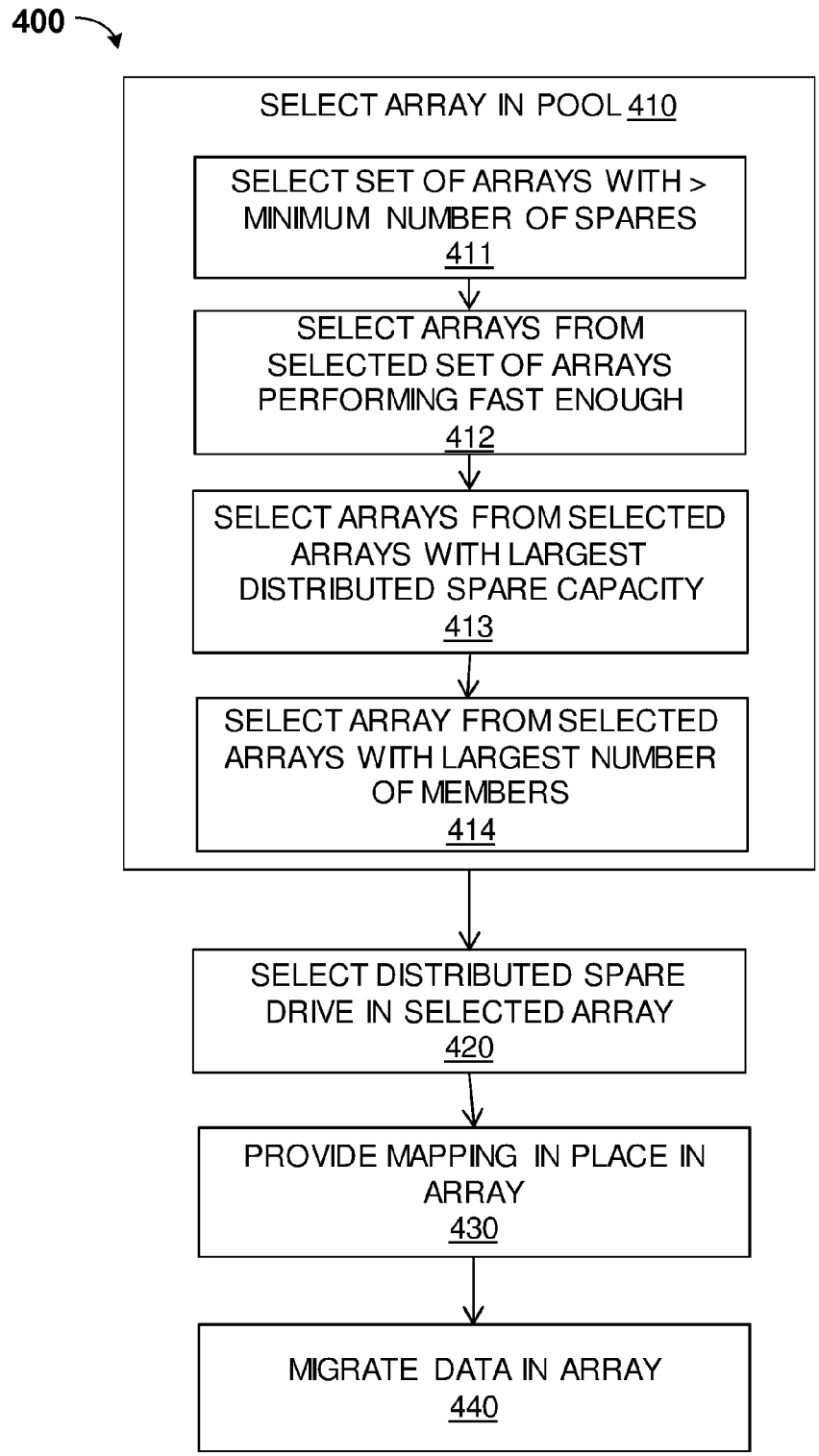
FIG. 4 is a flow diagram of an example embodiment.

Referring to FIG. 4, a flow diagram 400 shows further details of an example embodiment of the aspect of the method of FIG. 2 of re-allocation of one or more distributed spare drives for an array as available storage capacity.

When it is determined that one or more distributed spare drives are to be re-allocated, the method may select an array from the storage pool, step 410. This may be done by applying various configurable criteria. The options shown in FIG. 4 are example criteria, one or more of which may be applied in an optionally variable order.

In the example described, a set of arrays may be selected from the storage pool, step 411, each array having a minimum number of distributed spare drives.

From this selected set of arrays, a sub-set of arrays may be selected, step 412, which perform fast enough that they will be able to handle 1+1/Nth worth of work where N is the number of components in the array without causing performance problems.

From this selected sub-set of arrays, a further sub-set of arrays may be selected, step 413, which have the largest size of distributed spare space (i.e. drive capacity) in order to gain the most benefit.

From this selected sub-set of arrays, an array is selected, step 414, with the largest number of members as this array will be least impacted by the subsequent data movement.

Once an array has been selected, one or more distributed spare drives may be selected, step 420, in the selected array. A distributed spare drive (i.e. a set of chunks) is selected to sacrifice for pool enlargement. Usually there is nothing to distinguish which drive to select.

The method may then proceed in two phases, initially the method may use the re-allocated storage space 'in-place' where the distributed spare spaces were in the array. This may be carried out by providing forwarding markers in places in the array, step 430.

Optionally, the method may migrate the data in the array, step 440, in order to tidy-up the geometry and remove the markers. There are various possible methods of carrying out this migration of data known to a person skilled in the art.

Figure 5A:
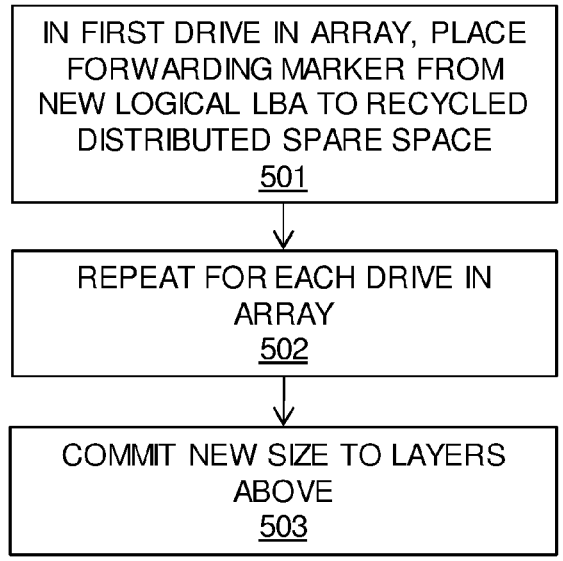
FIGS. 5A and 5B are flow diagrams of example embodiments of aspects of the method of FIG. 4.
Figure 5B:
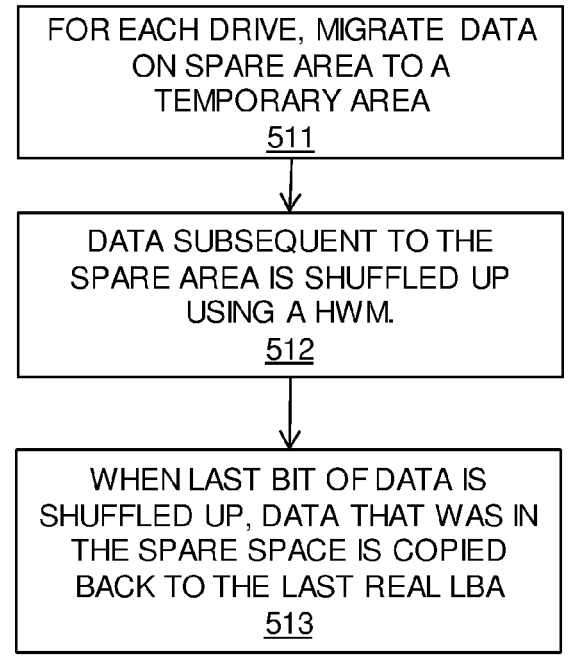

Referring to FIGS. 5A and 5B, flow diagrams 500 and 510, respectively, show further details of example embodiments of the aspects of the method of FIG. 4 of using the re-allocated storage space 'in-place' in the array and migrating the data in the array in order to tidy-up the geometry.

FIG. 5A shows a flow diagram 500 of an example embodiment of an embodiment of the described method of using re-allocated storage space in-place in the array.

In a first drive in the array, a forwarding marker may be placed from the new logical block address (LBA) to the recycled distributed spare space, step 501. The marker may be stored in a data structure in persistent memory, for example, as part of the same or linked data structure used to hold the parameters for the mapping of the logical unit (LU) LBAs to the drive LBAs.

This may be repeated for each drive in the array, step 502. Once forwarding markers are placed for each drive the size of the array may be increased.

The new size may be committed or published to the layers above, step 503, which can now map additional LU extents for the use of volumes.

FIG. 5B shows a flow diagram 510 of an example embodiment the aspect of the described method of migrating data in the array in the re-allocated spaces. The method may tidy-up the geometry and remove the forwarding markers by applying a migration of the data.

For each drive, the data on a spare area may be first migrated to a temporary area, step 511.

Data subsequent to the spare area may be shuffled up in a ripple type manner using a high water mark (HWM), step 512, to distinguish data that has and has not yet been copied up. There may be either one working point and HWM or one per drive to reduce the time taken to free up the marker and have an optimum standard layout.

When the last bit of data is shuffled up, the data that was in the spare area may be copied back to last real LBA, step 513, resulting in a neat geometry of the original format but with one less spare space.

This method may turn a data layout from:
"uuuuuuuuuuuuusssssssmmmmmmmmmmmmmm" to
"uuuuuuuuuuuuummmmmmmmmmmmmmmsssssss".

Where "u" indicates unmoved data, "s" indicates spare space, and "m" indicates moved data. Note some of the spare space may be being used as data. The high water mark indicates how far along the task of moving the sequence of "m"s the job is.

The technique is to take the left most "m", (the data to be moved with the lowest address) and copy it to the position of the leftmost "s" then advance the high water mark to indicate this is complete. The data contents of the source location of the copied data is abandoned and the space designated as an "s". If the leftmost "s" was being used to store data then this must be copied off to a temporary area first.

The sequence of "sssssss", which was the spare area, is thus shuffled one position to the right with each "m" copied. When it reaches the right hand end, it can be treated as a continuation of the new larger data area. It may be chosen to be moving one "s" area at a time, or one spare area on each physical drive may migrate simultaneously.

Referring to FIGS. 6A to 6B, an example embodiment is illustrated in the form of schematic diagrams 601, 602, 603, respectively, show three stages of drive data to which the methods of FIGS. 5A and 5B are applied.

In this example embodiment, a distributed array has a mapping from Small Computer System Interface (SCSI) Logical Unit LBA's (Logical Block Addressees) to physical SCSI LBA's on drives that are members of the array.

For the sake of explanation, this mapping is decomposed to physical components to enable the discussion of the distributed spares more simply.

Each diagram shows four columns: a first column 610 shows a Drive ID: Drive LBA; a second column 620 shows the LBA as the physical sequence of the area on disk and runs 1, 2, 3, 4, 5, etc. as an index; a third column 630 shows an indication of whether the LBA is Spare or Data; and the fourth column 640 shows a number of spare chunks in the preceding area which is used in summarized form.

Referring to FIG. 6A, the mapping initially occurs without regard to distributed spares mapping, a LU LBA to a Drive ID and Drive LBA 610. Each drive has one or more areas used for distributed spare use shown in FIG. 6A as S1 631, S2 632, and S3 633. Each drive has a number of regions distinguished by how much space is reserved PRIOR to an addressing LBA in that region as shown in fourth column 640. The summarized form of the number of regions for this example is {1-5=0, 6-8=1, 9=2, 10-11=3}. The space can be in the unit of 'chunks' where a chunk is 1/N times the size of a drive where N is the number of drives in the array.

However, it may be that a single distributed spare is distributed using multiple fractions of the 1/Nth size required on each drive and these fractions are spread through the drive address range—but the scheme shown in FIG. 6A (which is a simple one for means of explanation) can be applied in such cases in an obvious extension similar to how >1 distributed spare is handled, >1 distributed spare chunk fraction can be handled.

As in the example given above:
"uuuuuuuuuuuuusssssssmmmmmmmmmmmmmm" was turned into
"uuuuuuuuuuuuummmmmmmmmmmmmmmsssssss".

More than one distributed spare may be handled and
"uuuuuuuuuuuuusssssssmmmmmmmmmmmmmmmmmmmmmmmmmmsssssssmmmmmmmmmmmmmmmmm"
may be turned into
"uuuuuuuuuuuuummmmmmmmmmmmmmmmmmmmmmmmmmmmmmmmmmmssssssssssssss".

By moving the leftmost unmoved "m" to the position of the leftmost "s" and designating its source location as "s", the blocks of "s" are combed/migrated to the end of the sequence and once there can be treated as the end of a new larger data area.

An initial mapping is made to Drive ID and Drive LBA then the Drive LBA is increased by the number or spare chunks that precede it to derive the correct physical LBA on an actual drive. It should be noted that this is an example mechanism for reserving address space for distributed spare to enable further explanation. Often there may be only one sequence of spare chunks.

In FIG. 6B, the schematic diagram 602 shows that the spare space S1 631 is re-allocated as a new logical LBA. An additional row 650 is added to the structure and a marker 641 is provided from the new LBA 642 to the new data area 643.

In FIG. 6C, the schematic diagram 603 shows that the data has been migrated. The data in the new data area 643 of FIG. 6B is migrated to a temporary area and the cells of the columns shuffled up. The data in the temporary area is then added to the last row 644 such that the marker 641 may be removed.

Figure 7:
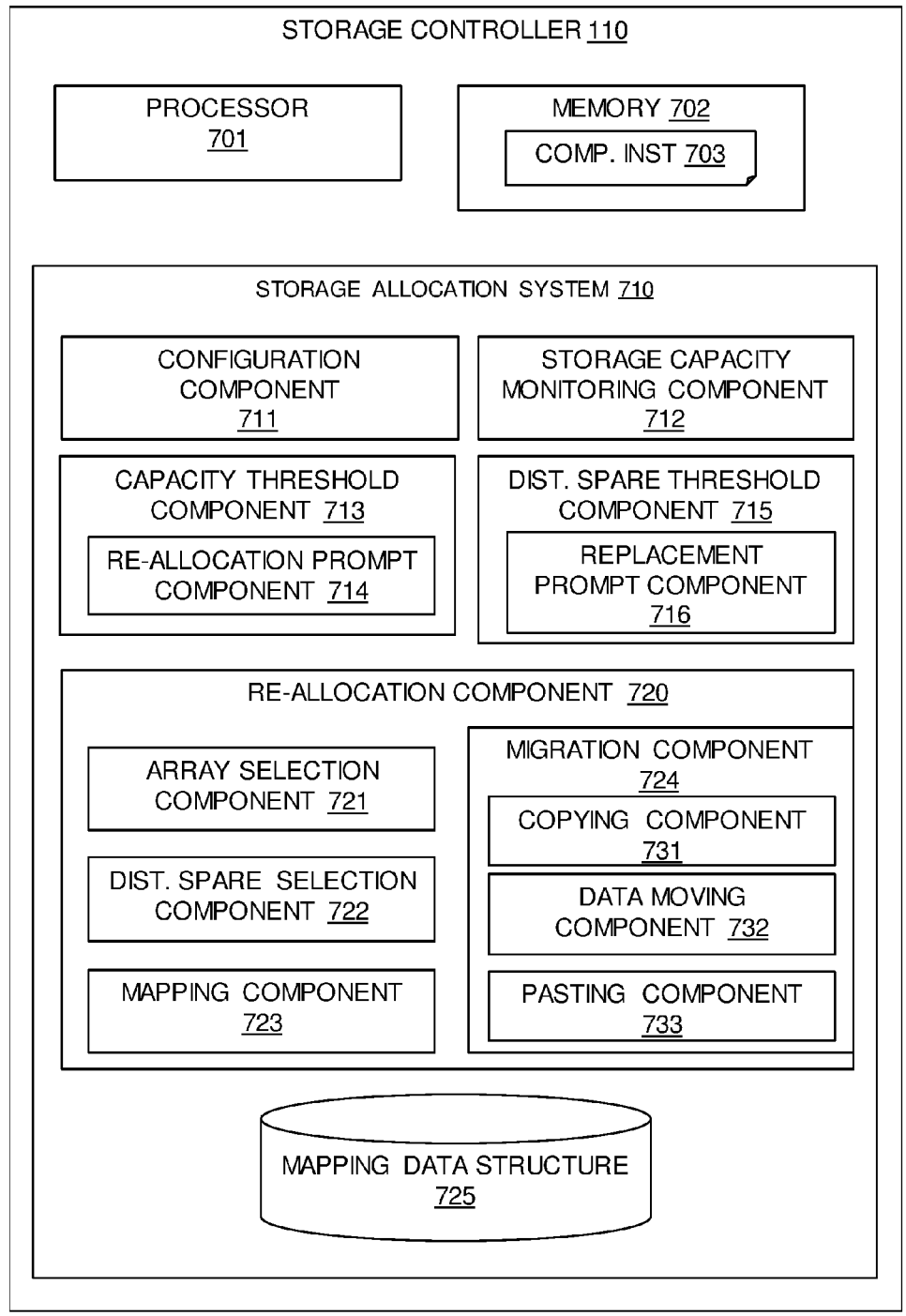
FIG. 7 is a block diagram of an example embodiment of a system.

Referring to FIG. 7, an example embodiment of a storage controller 110 is shown. The storage controller 110 may include at least one processor 701, a hardware module, or a circuit for executing the functions of the described components which may be software units executing on the at least one processor. Multiple processors running parallel processing threads may be provided enabling parallel processing of some or all of the functions of the components. Memory 702 may be configured to provide computer instructions 703 to the at least one processor 701 to carry out the functionality of the components.

The storage controller 110 may include a storage allocation system 710 adapted for the functionality of the described method of storage allocation.

The storage allocation system 710 may include a storage pool configuration component 711 for designating an initial available storage capacity in a storage pool having multiple storage drive arrays and allocating the remaining storage capacity in the storage pool to distributed spare space. The distributed spare space spreads portions of a spare drive across storage drives in an array.

The storage allocation system 710 may include a storage capacity monitoring component 712 for monitoring an amount of available storage capacity as data is stored to the storage pool. The storage allocation system 710 may include a capacity threshold component 713 for determining when a threshold of a minimum available storage capacity is reached. The threshold of a minimum available storage capacity may be set in the configuration component 712. The capacity threshold component 713 may include a re-allocation prompt component 714 for prompting re-allocation of storage capacity.

The storage allocation system 710 may include a distributed spare threshold component 715 for determining if a threshold of a minimum distributed storage space in the storage pool is reached. The threshold of a minimum distributed storage space may be set in the configuration component 712. The distributed spare threshold component 715 may include a replacement prompt component 716 for providing a prompt to replace physical storage drives in the storage pool when the threshold of the minimum distributed storage space is reached.

The storage allocation system 710 may include a re-allocation component 720 for re-allocating one or more distributed spare drives from an array to available storage capacity when the threshold of the minimum available storage capacity is reached.

The re-allocation component 720 may include: an array selection component 721 for selecting a storage drive array in the storage pool from which to re-allocate one or more distributed spare drives, a distributed spare selection component 722 for selecting one or more distributed spare drive in the selected storage drive array.

The re-allocation component 720 may also include a mapping component 723 for providing forwarding markers in each storage drive in the storage device array for mapping new data to locations previously allocated as spare space. The mapping component 723 may store the forwarding markers in a data structure 725 in persistent memory.

The re-allocation component 720 may also include a migration component 724 for migrating data in each storage drive in a storage drive array to remove forwarding markers. The migration component 724 for migrating data in a storage drive array may include: a copying component 731 for copying data from a location previously allocated as spare space to a temporary memory, a data moving component 732 for moving up data subsequent to the location previously allocated as spare space, and a pasting component 733 for copying back the data from the temporary memory to a last real location in the storage drive.

Figure 8:
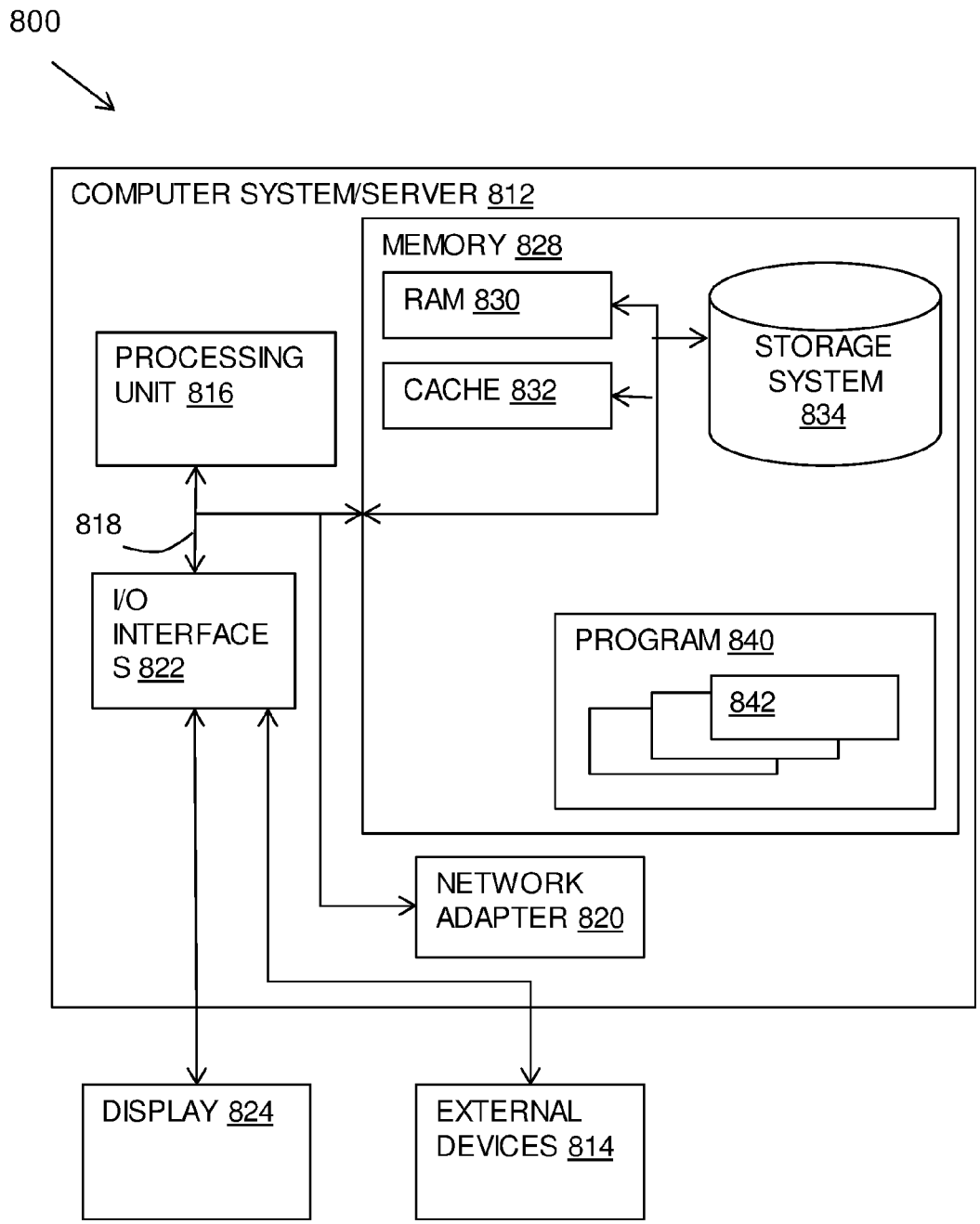
FIG. 8 is a block diagram of an embodiment of a computer system according to an exemplary embodiment.

Referring now to FIG. 8, a schematic of an example of a system 800 in the form of a computer system or server is shown.

A computer system or server 812 may be operational with numerous other general purpose or special purpose computing system environments or configurations. Examples of well-known computing systems, environments, and/or configurations that may be suitable for use with computer system/server 812 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 812 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 812 may be practiced in distributed cloud computing environments where tasks are performed by remote processing devices that are linked through a communications network. In a distributed cloud computing environment, program modules may be located in both local and remote computer system storage media including memory storage devices.

In FIG. 8, a computer system/server 812 is shown in the form of a general-purpose computing device. The components of the computer system/server 812 may include, but are not limited to, one or more processors or processing units 816, a system memory 828, and a bus 818 that couples various system components including system memory 828 to processor 816.

Bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 812 typically includes a variety of computer system readable media. Such media may be any available media that is accessible by computer system/server 812, and it includes both volatile and non-volatile media, removable and non-removable media.

System memory 828 can include computer system readable media in the form of volatile memory, such as random access memory (RAM) 830 and/or cache memory 832. Computer system/server 812 may further include other removable/non-removable, volatile/non-volatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 818 by one or more data media interfaces. As will be further depicted and described below, memory 828 may include at least one program product having a set (e.g., at least one) of program modules that are configured to carry out the functions of embodiments of the invention.

Program/utility 840, having a set (at least one) of program modules 842, may be stored in memory 828 by way of example, and not limitation, as well as an operating system, one or more application programs, other program modules, and program data. Each of the operating system, one or more application programs, other program modules, and program data or some combination thereof, may include an implementation of a networking environment. Program modules 842 generally carry out the functions and/or methodologies of embodiments of the invention as described herein.

Computer system/server 812 may also communicate with one or more external devices 814 such as a keyboard, a pointing device, a display 824, etc.; one or more devices that enable a user to interact with computer system/server 812; and/or any devices (e.g., network card, modem, etc.) that enable computer system/server 812 to communicate with one or more other computing devices. Such communication can occur via Input/Output (I/O) interfaces 822. Still yet, computer system/server 812 can communicate with one or more networks such as a local area network (LAN), a general wide area network (WAN), and/or a public network (e.g., the Internet) via network adapter 820. As depicted, network adapter 820 communicates with the other components of computer system/server 812 via bus 818. It should be understood that although not shown, other hardware and/or software components could be used in conjunction with computer system/server 812. Examples, include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Cloud model characteristics may include: on-demand self-service: a cloud consumer can unilaterally provision computing capabilities, such as server time and network storage, as needed automatically without requiring human interaction with the service's provider. Cloud model characteristics may further include broad network access: capabilities are available over a network and accessed through standard mechanisms that promote use by heterogeneous thin or thick client platforms (e.g., mobile phones, laptops, and PDAs); resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Further characteristics of cloud model may include rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time. Cloud model characterizes may include measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Cloud computing service models may include Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Cloud computing service models may further include Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Cloud computing service models may include Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Cloud computing deployment models may include private cloud: the cloud infrastructure is operated solely for an organization. It may be managed by the organization or a third party and may exist on-premises or off-premises.

Cloud computing deployment models may include community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Cloud computing deployment models may include public cloud: the cloud infrastructure is made available to the general public or a large industry group and is owned by an organization selling cloud services.

Cloud computing deployment models may include hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 9:
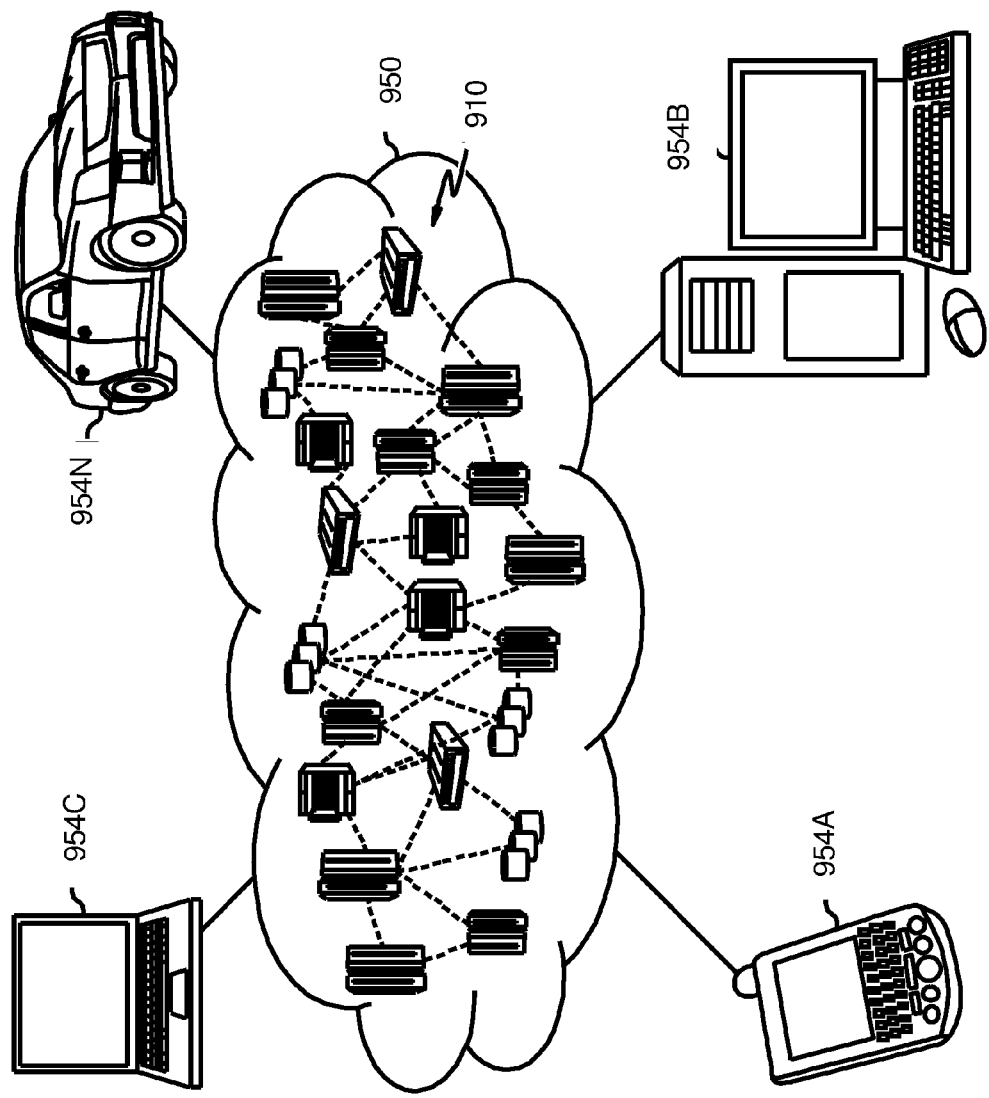
FIG. 9 is a schematic diagram of a cloud computing environment according to an exemplary embodiment.

Referring now to FIG. 9, illustrative cloud computing environment 950 is depicted. As shown, cloud computing environment 950 comprises one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 800, as shown in FIG. 8, and cloud computing environment 950 can communicate with any type of computerized device over any type of network and/or network addressable connection (e.g., using a web browser).

Figure 10:
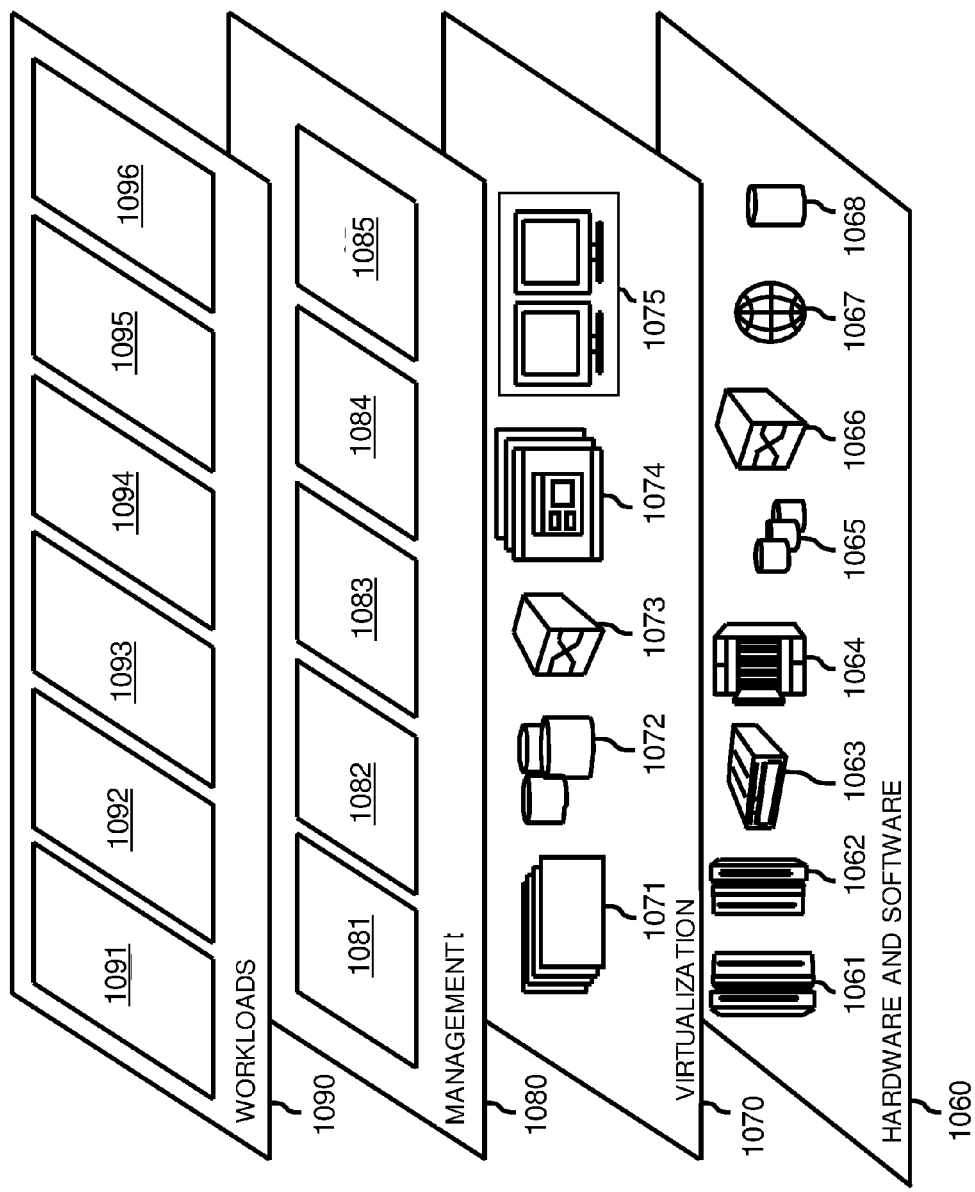
FIG. 10 is a diagram of abstraction model layers of a cloud computing environment according to an exemplary embodiment.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; and transaction processing 1095; and storage control and dynamic allocation 1096 as described above.

Improvements and modifications can be made to the foregoing without departing from the scope of the present invention.

It may be noted that not all advantages of the present invention are include above.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for storage capacity allocation, comprising:
providing a storage pool having multiple storage drive arrays;
designating an initial available storage capacity in the storage pool;
allocating the remaining storage capacity in the storage pool to distributed spare space, wherein distributed spare space spreads portions of a spare drive across multiple storage drives in an array;
monitoring an amount of available storage capacity as data is stored to the storage pool and determining when a threshold of a minimum available storage capacity is reached; and
re-allocating one or more distributed spare drives from an array to available storage capacity when the threshold of the minimum available storage capacity is reached, wherein re-allocating one or more distributed spare drives from an array to available storage capacity comprises copying data in a location previously allocated as spare space to a temporary memory, moving up data subsequent to the location previously allocated as spare space, and copying back the data from the temporary memory to a last real location in the storage drive.

2. The method as claimed in claim 1, further comprising iterating the method until it is determined that a threshold of a minimum distributed storage space is reached.

3. The method as claimed in claim 2, further comprising:
determining if the threshold of the minimum distributed storage space in the storage pool is reached, and when the threshold of the minimum distributed storage space is reached, providing a prompt to replace physical storage drives in the storage pool.

4. The method as claimed in claim 1, wherein re-allocating one or more distributed spare drives from an array to available storage capacity comprises:
selecting a storage drive array in the storage pool from which to re-allocate one or more distributed spare drives.

5. The method as claimed in claim 4, wherein selecting a storage drive array is based on one or more of the following criteria which can be applied in a designated order: a storage drive array having greater than a minimum number of spare drives, a storage drive array meeting a performance level; a comparison of the distributed spare capacity of storage drive arrays; and a comparison of the number of spare drives in the storage drive array.

6. The method as claimed in claim 4, wherein re-allocating one or more distributed spare drives from an array to available storage capacity comprises:
selecting one or more distributed spare drives in the selected storage drive array.

7. The method as claimed in claim 1, wherein the forwarding markers are stored in a data structure in persistent memory.

8. A computer system for storage capacity allocation, comprising:
one or more computer processors, one or more computer-readable storage media, and program instructions stored on one or more of the computer-readable storage media for execution by at least one of the one or more processors, the program instructions comprising:
program instructions to designate an initial available storage capacity in a storage pool having multiple storage drive arrays and program instructions to allocate the remaining storage capacity in the storage pool to distributed spare space, wherein distributed spare space spreads portions of a spare drive across multiple storage drives in an array;
program instructions to monitor an amount of available storage capacity as data is stored to the storage pool;
program instructions to determine when a threshold of a minimum available storage capacity is reached; and
program instructions to re-allocate one or more distributed spare drives from an array to available storage capacity when the threshold of the minimum available storage capacity is reached, wherein program instructions to re-allocate one or more distributed spare drives from an array to available storage capacity comprises program instructions to a copy data from a location previously allocated as spare space to a temporary memory, program instructions to move data subsequent to the location previously allocated as spare space, and program instructions to copy the data from the temporary memory to a last real location in the storage drive.

9. The computer system as claimed in claim 8, further comprising:
program instructions to determine if a threshold of a minimum distributed storage space in the storage pool is reached, and program instructions to replace prompt component for providing a prompt to replace physical storage drives in the storage pool when the threshold of the minimum distributed storage space is reached.

10. The computer system as claimed in claim 8, wherein program instructions to re-allocate one or more distributed spare drives from an array to available storage capacity comprises:
program instructions to select a storage drive array in the storage pool from which to re-allocate one or more distributed spare drives.

11. The computer system as claimed in claim 10, wherein the program instructions to select a storage drive array is based on one or more of the following criteria which can be applied in a designated order: a storage drive array having greater than a minimum number of spare drives, a storage drive array meeting a performance level; a comparison of the distributed spare capacity of storage drive arrays; and a comparison of the number of spare drives in the storage drive array.

12. The computer system as claimed in claim 10, wherein the program instructions to re-allocate one or more distributed spare drives from an array to available storage capacity comprises:
program instructions to select one or more distributed spare drives in the selected storage drive array.

13. The computer system as claimed in claim 8, wherein the program instructions to provide forwarding markers in each storage drive in the storage device stores the forwarding markers in a data structure in persistent memory.

14. The computer system as claimed in claim 8, further comprising:
program instructions to determine if the threshold of the minimum distributed storage space in the storage pool is reached, and when the threshold of the minimum distributed storage space is reached, program instructions to provide a prompt to replace physical storage drives in the storage pool.

15. A computer program product for storage capacity allocation, the computer program product comprising:
one or more computer-readable storage media and program instructions stored on the one or more computer-readable storage media, the program instructions comprising:
program instructions to provide a storage pool having multiple storage drive arrays;
program instructions to designate an initial available storage capacity in the storage pool;
program instructions to allocate the remaining storage capacity in the storage pool to distributed spare space, wherein distributed spare space spreads portions of a spare drive across multiple storage drives in an array;
program instructions to monitor an amount of available storage capacity as data is stored to the storage pool and determining when a threshold of a minimum available storage capacity is reached; and
program instructions to re-allocate one or more distributed spare drives from an array to available storage capacity when the threshold of the minimum available storage capacity is reached, wherein program instructions to re-allocate one or more distributed spare drives from an array to available storage capacity comprises program instructions to a copy data from a location previously allocated as spare space to a temporary memory, program instructions to move data subsequent to the location previously allocated as spare space, and program instructions to copy the data from the temporary memory to a last real location in the storage drive.

16. The computer program product as claimed in claim 15, further comprising:
program instructions to determine if a threshold of a minimum distributed storage space in the storage pool is reached, and program instructions to replace prompt component for providing a prompt to replace physical storage drives in the storage pool when the threshold of the minimum distributed storage space is reached.

17. The computer program product as claimed in claim 16, further comprising:
program instructions to determine if the threshold of the minimum distributed storage space in the storage pool is reached, and when the threshold of the minimum distributed storage space is reached, program instructions to provide a prompt to replace physical storage drives in the storage pool.

18. The computer program product as claimed in claim 15, wherein program instructions to re-allocate one or more distributed spare drives from an array to available storage capacity comprises:
program instructions to select a storage drive array in the storage pool from which to re-allocate one or more distributed spare drives.

19. The computer program product as claimed in claim 18, wherein the program instructions to select a storage drive array is based on one or more of the following criteria which can be applied in a designated order: a storage drive array having greater than a minimum number of spare drives, a storage drive array meeting a performance level; a comparison of the distributed spare capacity of storage drive arrays; and a comparison of the number of spare drives in the storage drive array.

20. The computer program product as claimed in claim 18, wherein the program instructions to re-allocate one or more distributed spare drives from an array to available storage capacity comprises:
   program instructions to select one or more distributed spare drives in the selected storage drive array.

* * * * *